(12) United States Patent
Hadas (10) Patent No.: US 9,695,965 B2
(45) Date of Patent: Jul. 4, 2017

(54) INTEGRAL VALVE

(71) Applicant: Guilboa S.A.C., Lima (PE)

(72) Inventor: Micha Hadas, Lima (PE)

(73) Assignee: GUILBOA S.A.C., Lima (PE)

(*) Notice: Subject to any disclaimer, the term of this patent is extended or adjusted under 35 U.S.C. 154(b) by 0 days.

(21) Appl. No.: 14/809,477

(22) Filed: Jul. 27, 2015

(65) Prior Publication Data

US 2016/0223092 A1 Aug. 4, 2016

Related U.S. Application Data (60) Provisional application No. 62/110,553, filed on Feb. 1, 2015.

(51) Int. Cl.
| | |
|---|---|
| *F16K 15/02* | (2006.01) |
| *F16L 29/00* | (2006.01) |
| *A01G 25/02* | (2006.01) |
| *F16K 15/03* | (2006.01) |
| *F16K 15/06* | (2006.01) |

(52) U.S. Cl.
CPC .......... *F16L 29/007* (2013.01); *A01G 25/023* (2013.01); *F16K 15/033* (2013.01); *F16K 15/063* (2013.01)

(58) Field of Classification Search
CPC .... F16L 29/007; F16K 15/026; F16K 15/063; F16K 15/066; F16K 15/033; A01G 25/16
USPC .................................. 137/535, 540, 542
See application file for complete search history.

(56) References Cited

U.S. PATENT DOCUMENTS

| | | | |
|---|---|---|---|
| 2,959,188 A | 11/1960 | Kepner | |
| 5,148,828 A * | 9/1992 | Farnham | E03C 1/106 137/454.6 |
| 5,267,690 A | 12/1993 | Gazzoni | |
| 2004/0045607 A1 | 3/2004 | Lammers | |
| 2007/0044848 A1 * | 3/2007 | Norman | F16K 15/063 137/542 |
| 2013/0206256 A1 | 8/2013 | Trudel et al. | |
| 2014/0252103 A1 | 9/2014 | Hamann | |

FOREIGN PATENT DOCUMENTS

| | | |
|---|---|---|
| CN | 102172197 B | 9/2011 |
| CN | 202252161 U | 5/2012 |

OTHER PUBLICATIONS

International Search Report and Written Opinion of ISA for PCT/IL2015/050768 (Nov. 9, 2015).

(Continued)

*Primary Examiner* — Craig Schneider
*Assistant Examiner* — P. Macade Nichols
(74) *Attorney, Agent, or Firm* — Koffsky Schwalb LLC; Mark I. Koffsky (57) ABSTRACT

A valve comprising a shoulder, a movable check member having a wall facing the shoulder and a coupling member. The movable check member is adapted to prevent fluid passage through or out of the valve when in contact with the shoulder. The coupling member is adapted to displace the movable check member away from the shoulder responsive to the pressure being applied on the wall exceeding a predetermined threshold. The coupling member is further adapted to retract and maintain the movable check member secured against the shoulder responsive to the fluid flow pressure at the wall dropping below the threshold.

19 Claims, 5 Drawing Sheets

(56) References Cited

OTHER PUBLICATIONS

Smart Products, Inc: Check Valves, Pressure Relief Valves (Available at: http://www.smartproducts.com/check_valve_operation.php).

* cited by examiner

INTEGRAL VALVE

CROSS-REFERENCE TO RELATED APPLICATION

This application claims the benefit of U.S. Provisional Application No. 62/110,553 filed Feb. 1, 2015, entitled "INTEGRAL VALVE", which is hereby incorporated by reference in its entirety without giving rise to disavowment.

TECHNICAL FIELD

The present disclosure relates to fluid valves in general, and to integral valves for drip irrigation lines, in particular.

BACKGROUND

Traditionally, drip line irrigation uses pipes to irrigate by dripping water or other fluids slowly from pipe lines using one or more irrigation drippers. Pulse irrigation is a method applied in drip irrigation systems which performs irrigation for short periods of time, typically not longer than a few minutes each, over multiple times throughout the day, e.g. 10 to 40 times a day. A crucial requirement of pulse irrigation is that the system remains full between consecutive irrigation cycles, as the relatively short bursts of irrigation make it prohibitive to wait for the system to get refilled again. At the end of an irrigation cycle the water found in the system may flow in different directions. The flow direction is affected mainly by the topography of the terrain, and to a lesser extent by other factors, such as the type of the drippers and their condition, the length of the laterals, the character and direction of the slope, the time period between one irrigation cycle to another, and so on. In terrains of large area or steep slopes, water may flow out of the system and drain to lower parts of the plot, resulting in damage to plants in the flooded area and impairment of irrigation uniformity due to suspension in water arrival to some of the drippers during refilling.

BRIEF SUMMARY

One exemplary embodiment of the disclosed subject matter is a valve comprising: a housing having a hollow body, an inlet end and an outlet end; a shoulder protruding inwardly from an inner surface of the hollow body; a movable check member disposed within the hollow body and comprising a wall facing the shoulder, the wall being configured to prevent fluid passage through the inlet end into the hollow body or out therefrom when said movable check member is in contact with said shoulder, and to allow fluid passage from the inlet end to the outlet end when said movable check member is displaced away from said shoulder; and, a coupling member connected to said movable check member and configured to enable displacement of said movable check member away from said shoulder responsive to the pressure applied on the wall by the fluid flow from the inlet end exceeding a threshold, and to retract and maintain said movable check member secured against said shoulder responsive to the fluid flow pressure at the wall dropping below the threshold.

Another exemplary embodiment of the disclosed subject matter is a pipeline comprising a plurality of valves, each valve of the plurality of valves comprising: a housing having a hollow body, an inlet end and an outlet end; a shoulder protruding inwardly from an inner surface of the hollow body; a movable check member disposed within the hollow body and comprising a wall facing the shoulder, the wall being configured to prevent fluid passage through the inlet end into the hollow body or out therefrom when said movable check member is in contact with said shoulder, and to allow fluid passage from the inlet end to the outlet end when said movable check member is displaced away from said shoulder; and, a coupling member connected to said movable check member and configured to enable displacement of said movable check member away from said shoulder responsive to the pressure applied on the wall by the fluid flow from the inlet end exceeding a threshold, and to retract and maintain said movable check member secured against said shoulder responsive to the fluid flow pressure at the wall dropping below the threshold.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to provide for a mechanism that allows water to run freely along pipe lines during irrigation, and prevents water from flowing outward from the pipe lines through the drippers between irrigation cycles.

One technical solution is to employ a Normally Close (NC) valve, comprising a movable check member having a wall for blocking water passage when disposed in a first position and allowing water passage when disposed in a second position, the movable check member being connected to a coupling member configured to hold the movable check member in the first position and displace it to the second position only in response to pressure being applied on the wall exceeding a threshold.

Another technical solution is to employ valves in accordance with the disclosed subject matter in multiple locations along a pipe line thereby segmenting the pipe line.

One technical effect of utilizing the disclosed subject matter is to prevent water from passing through the valve upstream or returning downstream when the pressure in the system drops below a certain level, for example during the period between irrigation cycles. In some exemplary embodiments, the valve may keep the branch line full between one irrigation cycle and another. The valve may also be useful when one or more drippers do not prevent return flow or runoff. In such cases only the corresponding segment of lateral containing those drippers will be drained off, instead of the whole lateral. Accordingly, the valve may be useful for irrigation by pulse methods.

Another technical effect of utilizing the disclosed subject matter is to prevent water movement in an ascending and a descending lateral. In some exemplary embodiments, the valve may function in any gradient: in an upward direction, in a downward direction, and at changing gradients along the branch line. The valve may enable the installation of drip irrigation systems preventing runoff also in relatively strong gradients, at the ascent or descent of the slope. The valve may prevent the entrance of water at the descent from the main piping and the distribution pipeline to the drip lines.

Yet another technical effect of utilizing the disclosed subject matter is dividing a long lateral into short independent sections of substantially uniform pressure each, by deploying a plurality of the valves at predetermined distances along a pipe line. The use of the valve may enable design of longer laterals, which are indifferent to the nature of the gradients and their length.

In some exemplary embodiments, the valve may comprise a housing having a hollow body, an inlet end and an outlet end. In some exemplary embodiments, the valve may comprise a shoulder protruding inwardly from an inner surface of the hollow body. In some exemplary embodiments, the wall of the movable check member may be in contact with the shoulder when disposed in the first position, and displaced away from the shoulder when in the second position. In some exemplary embodiments, the shoulder may extend throughout at least a portion of an interior circumference of the hollow body.

In some exemplary embodiments, the coupling member may comprise a spring or a similar mechanism capable of resisting mobility at low force exertion.

In some exemplary embodiments, the movable check member may comprise a leg extending from the wall in an opposite direction to the shoulder and rested on a support member connected to at least a portion of an interior circumference of the valve. The support member may comprise a shaft adapted to accommodate the leg and allow displacement of the movable check member back and forth along a flow direction through the valve, as the leg moves into and out of the shaft.

In some exemplary embodiments, the support member may comprise one or more apertures enabling fluid passage therethrough.

In some exemplary embodiments, the coupling member may be mounted on the support member and around the leg. The coupling member may be adapted to contract when the movable check member is displaced away from the shoulder.

In some exemplary embodiments, the wall of the movable check member may further comprise a ring mounted on the circumference thereof for sealing a fluid pathway when secured against the shoulder.

In some exemplary embodiments, the housing may further comprise a base portion extending inwardly into the hollow body. The movable check member may be connected to the base portion by a hinge and being displaced away from or towards the shoulder by rotating around the hinge's axis. The coupling member may be connected to the base and adapted to extend when the movable check member is displaced away from the shoulder.

In some exemplary embodiments, the threshold such that displacement of the movable check member occurs when being exceeded by the pressure applied on the wall, thus causing the valve to open, may be between about 0.3 BAR to about 0.7 BAR, and preferably about 0.5 BAR.

In some exemplary embodiments, the housing may be configured in size and shape to be integrated within a pipe line. In some exemplary embodiments, the housing may have the dimensions of an integral dripper. The housing may have a general shape of a cylinder that has a diameter which corresponds to the inner diameter of a pipe line, such as 12 mm, 16 mm, 20 mm, or the like. The shape of the valve may correspond to the shape of the pipe line and may not exceed the borderline of the pipe to avoid introducing geometric limitations on the use of the pipe line on which the valve is installed.

It will be noted, that the term "pipe line" could be with or without drippers, may relate to a main pipe line, to a dripline, a branch line, a lateral, or the like. Without loss of generality, herein below we refer to branch lines.

The valve may be inserted into the branch line during manufacture, such as when curing polymer compound (e.g., Polyethylene, or the like) to the form of the pipe. In some exemplary embodiments, one or more valves may be inserted to the lateral during the production process, in pre-determined intervals (e.g. 15 meters, 20 meters, 30 meters, or the like), or as required by the customer/designer, based on the nature of the terrain. Between the valves there may or may not be drippers. The valves may divide the branch line into separate segments which may independently provide water to the dripping irrigation system mounted thereon. In some cases, the use of the valves may turn a relatively long lateral into a collection of short and self-contained sections, when each section has (relatively) uniform topography and pressure. Such embodiments may be useful when deploying drip line irrigation system in topographically challenging terrain and where long laterals are required.

Additionally or alternatively, the valve may be installed outdoors on a pipe using a barbed connection. The valve may function as a joint and may have barbed connections in both sides, which fit on a corresponding diameter of the line itself. Manual assembly of this type of valves may be performed instead of or in addition to using pre-installed integral drippers or valves in the branch line.

In some exemplary embodiments, the housing may further comprise one or more friction inducing members disposed on the outer surface of the hollow body for latching into the inner surface of a pipe. The friction inducing members may help fixating the valve in place and preventing it from shifting position within the pipe line after deployment.

In some exemplary embodiments, the valve may be utilized with combination of any type of drip irrigation system: Integral drip system (cylinder and wall), barbed on-line emitter system or the like.

In some exemplary embodiments, the valve may not change the properties of the drip irrigation system itself, but enhance or enable its performance. In some exemplary embodiments, the valve may reduce to a minimum the suction effect, thus enhancing the efficiency of drip irrigation systems preventing return flow. Such an advantage may be exhibited with any drip irrigation system and in particular in subsurface drip irrigation system.

In some exemplary embodiments, valves may be placed along the branch line, at pre-determined intervals (for instance every 10 or 15 meters), or at such intervals as the customer/planner may order, considering the nature of the terrain. In some exemplary embodiments, the intervals may comprise a larger volume of fluid, such as water, that is required to cause the sufficient pressure to open the valve. For example, in case of 0.5 BAR pressure, approximately 5 meters of water column may be required in order to apply sufficient pressure. In such a case, the vertical height of the interval must not be shorter than 5 meters, and preferably is lower, such as at least about 3 meters.

Figure 1A:
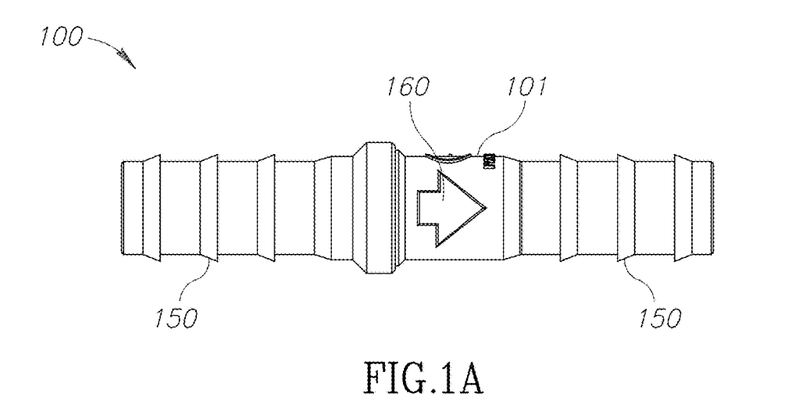
FIG. 1A shows a valve, in accordance with some exemplary embodiments of the subject matter.

Reference is now made to FIG. 1A, showing a valve in accordance with some exemplary embodiments.

Valve 100 may comprise a Housing 101 having a hollow body, an inlet end and an outlet end. In some exemplary embodiments, Housing 101 may comprise one or more Friction Inducing Members 150 disposed on the outer surface of the hollow body for latching into the inner surface of a pipe. In some exemplary embodiments, Housing 101 may comprise a Marking 160 identifying flow direction within the flow channel of Valve 100.

Figure 1B:
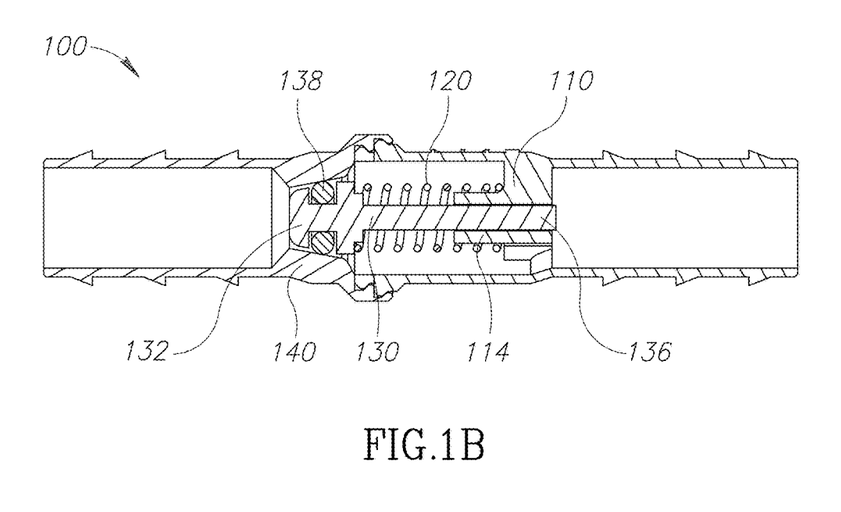
FIG. 1B shows a longitudinal cross section of a valve in closed position, in accordance with some exemplary embodiments of the subject matter.

Reference is now made to FIG. 1B, showing a longitudinal cross section of Valve 100 of FIG. 1A in closed position, in accordance with some exemplary embodiments of the subject matter.

Valve 100 may comprise a Shoulder 140, a Movable Check Member 130 and a Coupling Member 120. Shoulder 140 may protrude inwardly from an inner surface of the hollow body of Housing 101. Movable Check Member 130 may comprise a Wall 132 facing Shoulder 140. Wall 132 may be configured to prevent fluid passage through the inlet when being in contact with Shoulder 140. In some exemplary embodiments, the shape of Shoulder 140 may be configured to mate with the shape of Wall 132, such as having opposite slopes. In some exemplary embodiments, Wall 132 may have a frustoconical shape and Shoulder 140 may be shaped as a matching crater.

Movable Check Member 130 may comprise a Leg 136 extending from Wall 132 in an opposite direction to Shoulder 140. Housing 101 may comprise a Support Member 110 connected to at least a portion of an interior circumference of the hollow body. Support Member 110 may comprise a Shaft 114 for accommodating Leg 136, to guide movement of Movable Check Member 130 within the hollow body when displaced away from and towards Shoulder 140. Coupling Member 120 may be mounted on Support Member 110 around Leg 136. In some exemplary embodiments, Coupling Member 120 may circumvent Shaft 114. Coupling Member 120 may apply pressure on Movable Check Member 130 to secure Wall 132 against Shoulder 140 for sealing flow channel of Valve 100.

In some exemplary embodiments, a Ring 138 may be mounted on the circumference of Wall 132. Ring 138 may be a formed out of rubber or similar material. Ring 138 may be useful for providing hermetic sealing that would prevent any fluid leakage though flow channel of Valve 100. In some exemplary embodiments, Wall 132 may comprise a recess for receiving Ring 138.

Figure 1C:
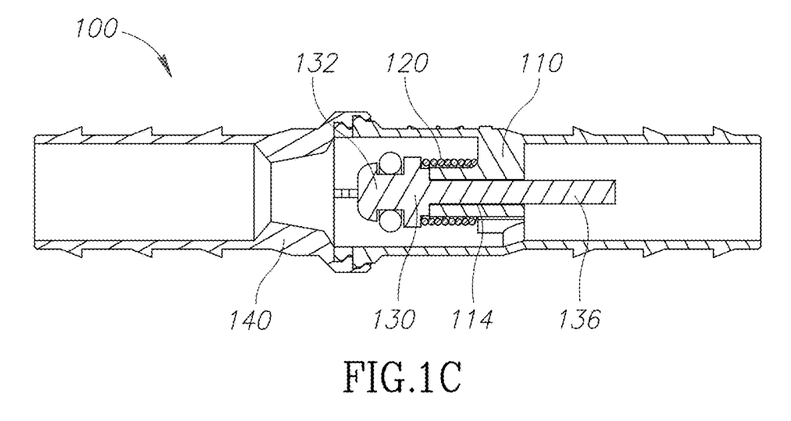
FIG. 1C shows a longitudinal cross section of a valve in open position, in accordance with some exemplary embodiments of the subject matter.

Reference is now made to FIG. 1C, showing a longitudinal cross section of Valve 100 of FIGS. 1A-1B in open position, in accordance with some exemplary embodiments of the subject matter.

Wall 132 may be configured to allow fluid passage through Valve 100 when Movable Check Member 130 is displaced away from Shoulder 140. Coupling Member 120 may be configured to displace Movable Check Member 130 away from Shoulder 140 responsive to sufficient pressure being applied on Wall 132. Leg 136 may pass through Shaft 114 beyond the boundary of Support Member 110, thereby allowing Movable Check Member 130 to change its position along a horizontal axis in between inlet end and outlet end and change from a close position to an open position.

Figure 1D:
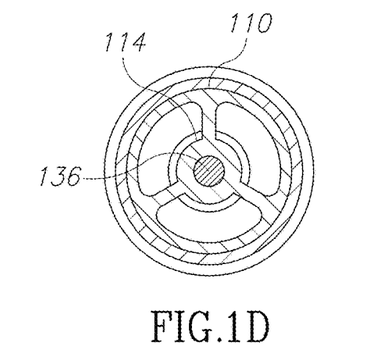
FIG. 1D shows a latitudinal cross section of a valve, in accordance with some exemplary embodiments of the subject matter.

Reference is now made to FIG. 1D, showing a latitudinal cross section of Valve 100 of FIGS. 1A-1C, in accordance with some exemplary embodiments of the subject matter.

Support Member 110 may comprise one or more apertures enabling fluid passage therethrough. The one or more apertures may be evenly spaced around Shaft 114 accommodating Leg 136.

Figure 1E:
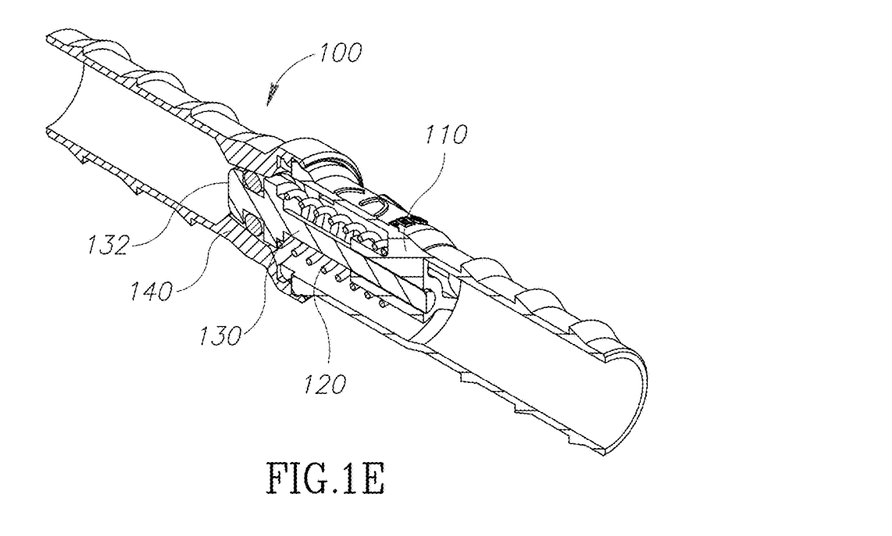
FIG. 1E shows a perspective view of a valve in a closed position, in accordance with some exemplary embodiments of the subject matter.

Reference is now made to FIG. 1E, showing a perspective view of Valve 100 of FIGS. 1A-1D, in accordance with some exemplary embodiments of the subject matter.

Coupling Member 120 may be configured to retract Movable Check Member 130 towards Shoulder 140 and away from Support Member 110, responsive to the fluid flow pressure at Wall 132 dropping below a threshold level. Coupling Member 120 may maintain Wall 132 secured against Shoulder 140 by applying pressure on Movable Check Member 130, similarly as in FIG. 1B.

Reference is now made to FIGS. 2A-2H, showing a valve in accordance with some exemplary embodiments.

Figure 2A:
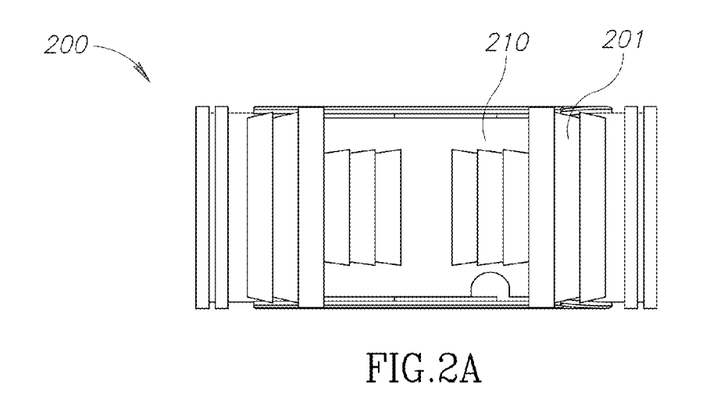
FIG. 2A shows a top view of a valve, in accordance with some exemplary embodiments of the subject matter.

Reference is now made to FIG. 2A, showing a top view of a valve, in accordance with some exemplary embodiments of the subject matter.

Valve 200 may comprise a Housing 201 having the general shape of the branch line or interior thereof, and a Base 210 that may or may not be integral part of Housing 201. Housing 201 may have an inlet end, an outlet end and a flow channel there between.

Figure 2B:
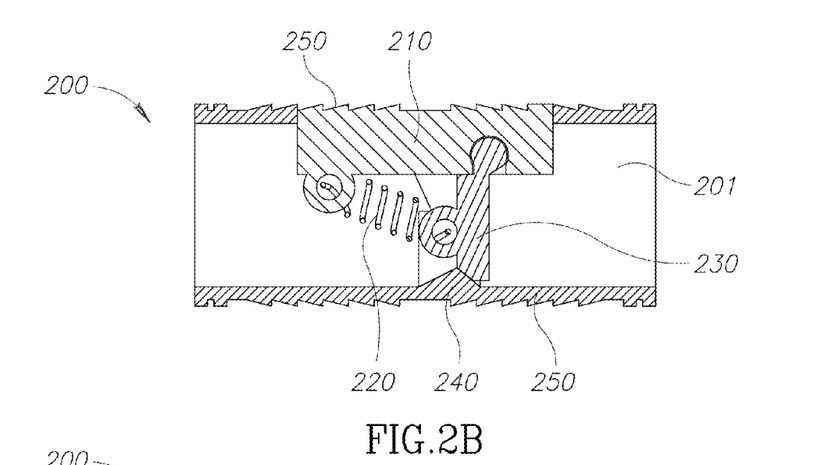
FIG. 2B shows a longitudinal cross section of a valve in closed position, in accordance with some exemplary embodiments of the subject matter.

Reference is now made to FIG. 2B, showing a longitudinal cross section of Valve 200 of FIG. 2A in closed position, in accordance with some exemplary embodiments of the subject matter.

Valve 200 may comprise a Movable Check Member 230 and a Coupling Member 230. In some exemplary embodiments, Coupling Member 230 may be connected to Base 210 to apply pulling force on Movable Check Member 230 to cause Movable Check Member 230 to be closed against Shoulder 240.

In some exemplary embodiments, on the external surface of Housing 201 there may be Friction Inducing Members 250, such as protrusions, threaded surface, bumps, or the like. Friction Inducing Members 250 may be configured to cause friction which would reduce the possibility that Housing 201 may shift its position when positioned in the internal portion of the branch pipe, such as when Valve 200 is mounted on the branch line during production.

Figure 2C:
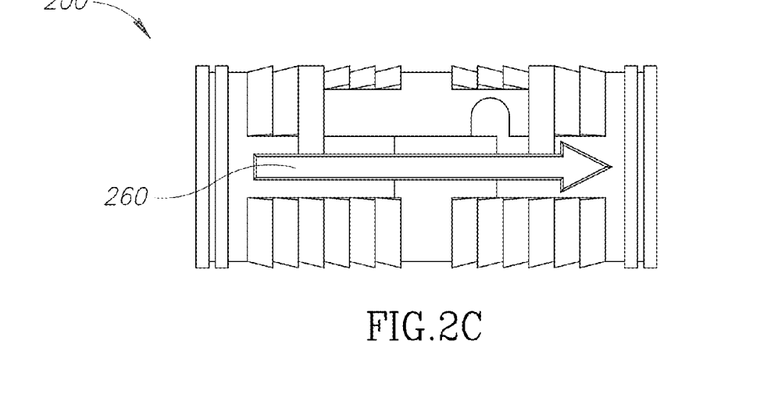
FIG. 2C shows a side view of a valve, in accordance with some exemplary embodiments of the subject matter.

Reference is now made to FIG. 2C, showing a side view of a Valve 200 of FIG. 2A-2B, in accordance with some exemplary embodiments of the subject matter.

In some exemplary embodiments, a Marking 260 may be used to clarify the flow direction from the inlet end towards the outlet end.

Figure 2D:
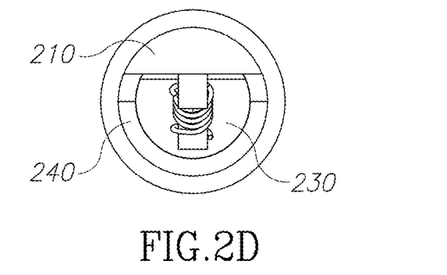
FIG. 2D shows a latitudinal cross section of a valve, in accordance with some exemplary embodiments of the subject matter.

Reference is now made to FIG. 2D, showing a latitudinal cross section of Valve 200 of FIG. 2A-2C, in accordance with some exemplary embodiments of the subject matter.

Shoulder 240 may protrude inwardly from the interior of Housing 201. Shoulder 240 may be extended throughout the interior circumference of Housing 201 or portion thereof. In some cases, Shoulder 240 may begin at one side of the perpendicular wall and end at the other side of the perpendicular wall so as to form a sealing wall when Movable Check Member 230 is closed shut against Shoulder 240. Shoulder 240 may ensure that even if force is exerted on Movable Check Member 230 in the opposite direction, no leakage will occur from the outlet end towards the inlet end.

Figure 2E:
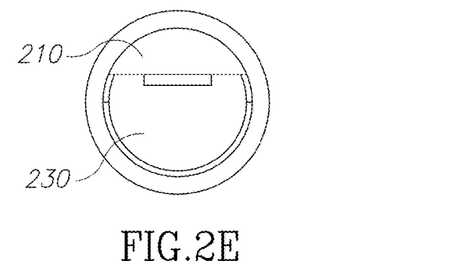
FIG. 2E shows a latitudinal cross section of a valve in closed position, in accordance with some exemplary embodiments of the subject matter.

Reference is now made to FIG. 2E, showing a latitudinal cross section of Valve 200 of FIG. 2A-2D in closed position, in accordance with some exemplary embodiments of the subject matter.

In some exemplary embodiments, Base 210 may have a perpendicular wall configured in size and in shape to block a portion of the internal opening within Housing 201. Movable Check Member 230 may be configured to block the remainder portion of the internal opening within Housing 201 when being disposed perpendicularly to Base 210.

Figure 2F:
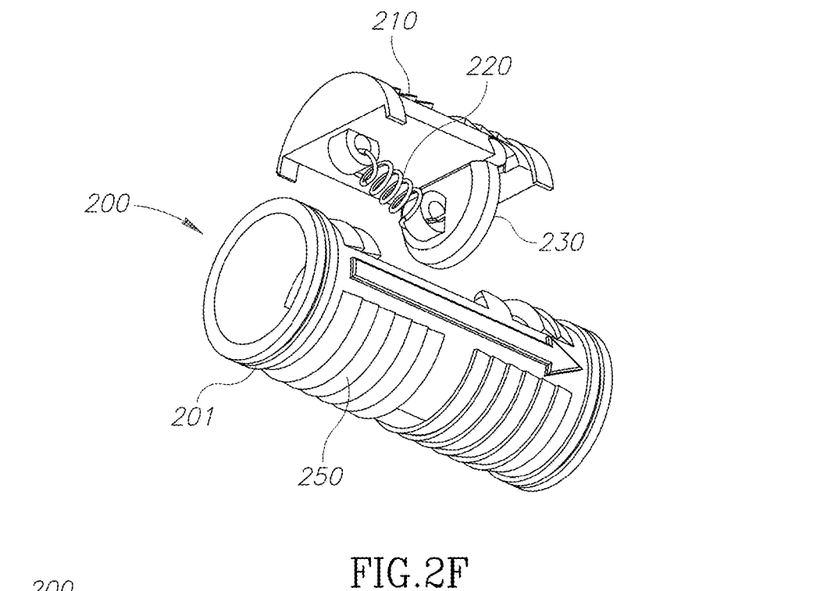
FIG. 2F shows an exploded view of a valve, in accordance with some exemplary embodiments of the subject matter.

Reference is now made to FIG. 2F, showing an exploded view of Valve 200 of FIG. 2A-2E, in accordance with some exemplary embodiments of the subject matter.

Figure 2G:
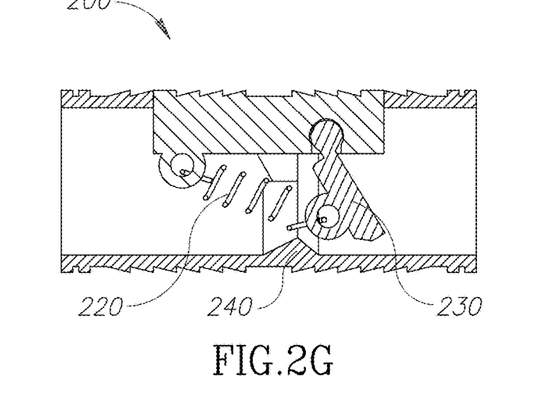
FIG. 2G shows a longitudinal cross section of a valve in open position, in accordance with some exemplary embodiments of the subject matter

Reference is now made to FIG. 2G, showing a longitudinal cross section of Valve 200 of FIG. 2A-2F in open position, in accordance with some exemplary embodiments of the subject matter.

In some exemplary embodiments, Movable Check Member 230 may have a rotation axis allowing Movable Check Member 230 to either be in a closed position or rotate to an open position. Upon applying sufficient pressure, such as 0.3 BAR, on Movable Check Member 230, Movable Check Member 230 may rotate to an open position.

Figure 2H:
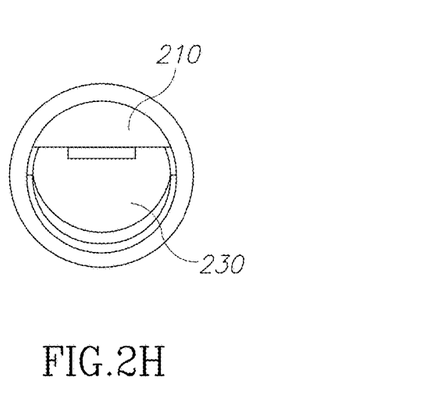
FIG. 2H shows a latitudinal cross section of a valve in open position, in accordance with some exemplary embodiments of the subject matter.

FIG. 2H shows a latitudinal cross section of Valve 200 of FIG. 2A-2G in open position, in accordance with some exemplary embodiments of the subject matter.

In some exemplary embodiments, Movable Check Member 230 is configured to allow fluid passage when disposed in an angle relative to the perpendicular wall of Base 210.

In some exemplary embodiments, a valve according to the disclosed subject matter may have the following characteristics: Opening pressure—0.5 BAR; Closure pressure—0.00 BAR (NC); Head loss—0.15 BAR×600 L/H; Sturdy, endure up to 150,000 operations in its lifetime. (Equivalent to 40 acts of opening/closure per day×10 years); Spring produced from stainless steel SAE-316, for working under conditions of irrigation using recycled and fertilizers water; Made of resistant plastic material; Operating at 360° position within the lateral line.

Figure 3:
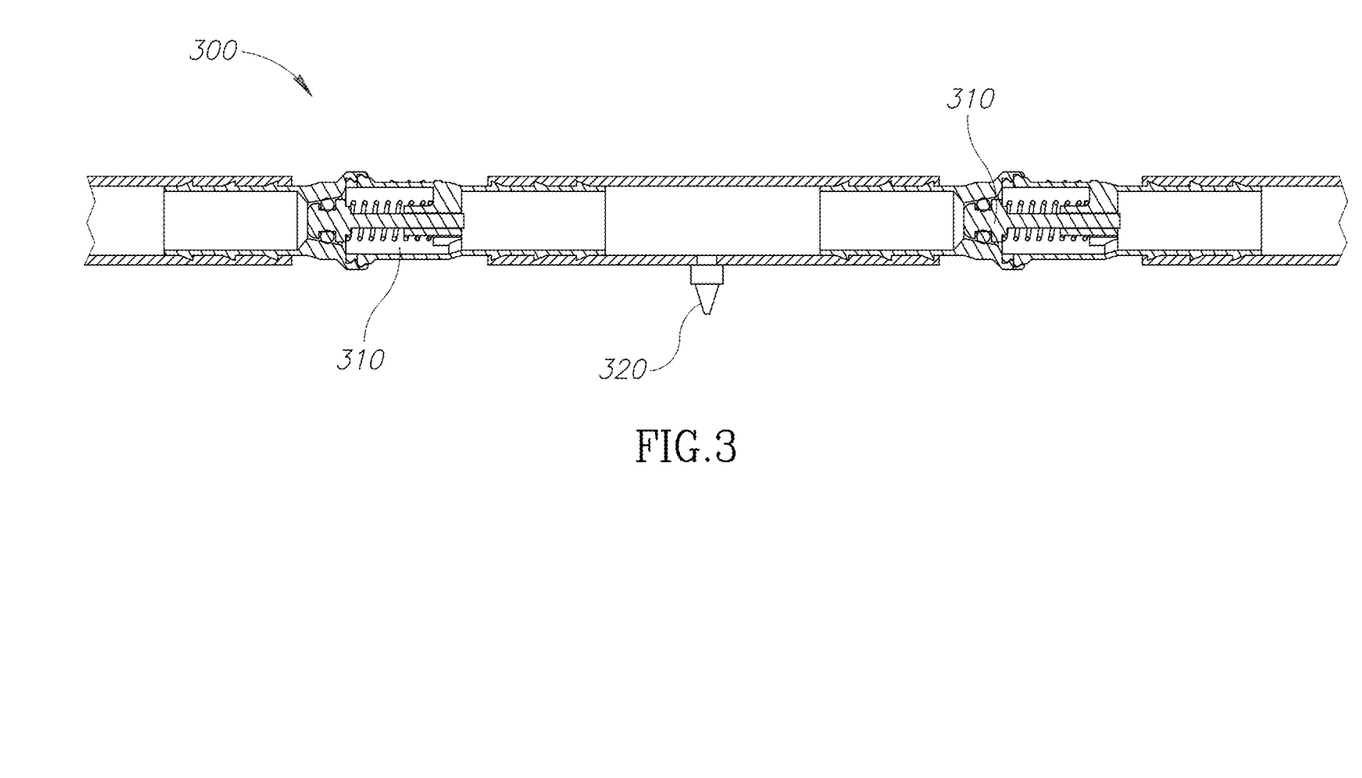
FIG. 3 shows a pipeline, in accordance with some exemplary embodiments of the disclosed subject matter.

FIG. 3 shows a pipeline, in accordance with some exemplary embodiments of the disclosed subject matter.

Pipeline 300 comprises a plurality of Valves 310 that are mounted at desired locations. In some exemplary embodiments, Valves 310 are spaced at predetermined intervals along Pipeline 300. In some exemplary embodiments, each pair of valves define a section that is independent of the other sections when both valves are in closed positions. In some exemplary embodiments, Drippers 320 may be installed in the independent sections defined by Valves 310.

In some exemplary embodiments, Pipeline 300 may be a pipe lateral and may comprise an inlet through which fluid is exclusively provided to the pipe lateral. A plurality of Valves 310 may be deployed serially in the pipe lateral after the inlet of the pipe lateral. Each of the plurality of Valves 310 may have an inlet and an outlet. The inlet of the pipe lateral may be connected to the inlet of a first valve of Valves 310. The outlet of the first valve may be connected to the inlet of a second valve of Valves 310.

In some exemplary embodiments, a pipe system may comprise a main pipe and a plurality of pipe laterals such as Pipeline 300. Each of the plurality of pipe laterals may be connected separately to the main pipe. The main pipe may feed the inlet of each pipe lateral. The pipe system may be segmented by the serially deployed Valves 310 into individual segments, each having substantially uniform fluid pressure.

It will be appreciated by persons skilled in the art that the present invention is not limited by what has been particularly shown and described hereinabove. Rather the scope of the invention also includes variations and modifications that would occur to persons skilled in the art upon reading the foregoing description and which are not in the prior art.

The flowchart and block diagrams in the Figures illustrate the architecture, functionality, and operation of possible implementations of systems, methods and computer program products according to various embodiments of the present disclosed subject matter. It should also be noted that, in some alternative implementations, the functions noted in the block may occur out of the order noted in the figures. For example, two blocks shown in succession may, in fact, be executed substantially concurrently, or the blocks may sometimes be performed in the reverse order, depending upon the functionality involved.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A process of using a plurality of valves in a drip irrigation pipe line configured to house the plurality of valves and one or more drippers deployed therebetween, whereby the plurality of valves divide the pipe line into a plurality of separate segments enables each for providing fluid flow via the one or more drippers independently of other segments, each valve of the plurality of valves comprising:
a housing having a hollow body, an inlet end and an outlet end;
a shoulder protruding inwardly from an inner surface of the hollow body;
a movable check member disposed within the hollow body and comprising a wall facing the shoulder, the wall being configured to prevent fluid passage through the inlet end into the hollow body or out therefrom when said movable check member is in contact with said shoulder, and to allow fluid passage from the inlet end to the outlet end when said movable check member is displaced away from said shoulder; and,
a coupling member connected to said movable check member and configured to enable displacement of said movable check member away from said shoulder responsive to a pressure applied on the wall by a fluid flow from the inlet end exceeding a threshold, and to retract and maintain said movable check member secured against said shoulder responsive to the fluid flow pressure at the wall dropping below the threshold.

2. The process of claim 1, wherein said coupling member comprises a spring.

3. The process of claim 1, wherein said shoulder extends throughout at least a portion of an interior circumference of the hollow body.

4. The process of claim 1, wherein said movable check member comprises a leg extending from the wall in an opposite direction to the shoulder, wherein said housing comprises a support member connected to at least a portion of an interior circumference of the hollow body, the support member comprising a shaft adapted to accommodate the leg, whereby allowing displacement of said movable check member back and forth along a flow direction from the inlet end to the outlet end.

5. The process of claim 4, wherein said coupling member is mounted on the support member around the leg and is adapted to be pushed when said movable check member is displaced away from said shoulder.

6. The process of claim 4, wherein the wall of said movable check member further comprises a ring mounted on a circumference of said movable check member for sealing a fluid pathway when secured against said shoulder.

7. The process of claim 4, wherein the support member comprises one or more apertures enabling fluid passage therethrough.

8. The process of claim 1, wherein said housing further comprises a base portion extending inwardly into the hollow body, wherein said movable check member is connected to the base portion by a hinge, such that said movable check member is being displaced away from or towards said shoulder by rotating around a hinge axis.

9. The process of claim 8, wherein said coupling member is connected to the base and adapted to be pulled when said movable check member is displaced away from said shoulder.

10. The process of claim 1, wherein the threshold is between about 0.3 BAR to about 0.7 BAR.

11. The process of claim 10, wherein the threshold is about 0.5 BAR.

12. The process of claim 1, wherein said housing is configured in size and shape to be integrated within a pipe line.

13. The process of claim 1, wherein said housing further comprises one or more friction inducing members disposed on an outer surface of the hollow body for latching into an inner surface of a pipe.

14. The process of claim 1, wherein said housing further comprises a first connector configured to engage with a second connector to connect said valves with a pipe.

15. The process of claim 1, wherein the plurality of valves are spaced at predetermined intervals.

16. The process of claim 1, wherein the valves are configured in size and shape for being integrated in the drip irrigation pipe line during manufacturing, whereby the valves are pre-installed prior to deployment in field.

17. The process of claim 1, wherein the valves are configured in size and shape for being connected at one end to a first pipe portion comprising the drip irrigation pipe line and at the other end to a second pipe portion comprising the drip irrigation pipe line, whereby allowing for customized installation on field.

18. A pipe lateral having one or more drippers located therealong, the pipe lateral comprising:
an inlet of the pipe lateral through which fluid is exclusively provided to the pipe lateral;
a first valve having an inlet and an outlet;
a second valve having an inlet and an outlet; and
wherein the first valve and the second valve are deployed serially in the pipe lateral after said inlet of the pipe lateral, wherein the outlet of said first valve is connected to the inlet of the second valve, wherein said inlet of the pipe lateral is connected to the inlet of said first valve, wherein the one or more drippers are located between the first valve and the second valve.

19. A pipe system comprising:
one or more pipe laterals of claim 18, wherein each pipe lateral is connected separately to a main pipe, wherein the one or more pipe laterals are configured for being fed by the main pipe at an inlet of each pipe lateral; and
whereby the pipe system is segmented into individual segments, each having substantially uniform fluid pressure.

* * * * *